US012485055B2

(12) United States Patent
Lindemann et al.

(10) Patent No.: US 12,485,055 B2
(45) Date of Patent: Dec. 2, 2025

(54) FINGER MOTION RAIL FOR CARRYING OUT A CONTINUOUS, PASSIVE AND/OR ACTIVELY ASSISTED MOVEMENT OF A FINGER AND/OR A THUMB OF A PATIENT, AS WELL AS A THERAPEUTIC DEVICE COMPRISING A FINGER MOTION RAIL OF THIS TYPE

(71) Applicant: UNIVERSITAETSmedizin der Johannes Gutenberg—Universitaet Mainz, Mainz (DE)

(72) Inventors: Pascal Lindemann, Mainz (DE); Christof Steiner, Pforzheim (DE)

(73) Assignee: UNIVERSITÄTSmedizin der Johannes Gutenberg-Universität Mainz, Mainz (DE)

( * ) Notice: Subject to any disclaimer, the term of this patent is extended or adjusted under 35 U.S.C. 154(b) by 1004 days.

(21) Appl. No.: 17/608,804

(22) PCT Filed: May 8, 2020

(86) PCT No.: PCT/DE2020/100390
§ 371 (c)(1),
(2) Date: Nov. 4, 2021

(87) PCT Pub. No.: WO2020/224727
PCT Pub. Date: Nov. 12, 2020

(65) Prior Publication Data
US 2022/0296453 A1 Sep. 22, 2022

(30) Foreign Application Priority Data
May 8, 2019 (DE) ........................ 102019112049.7

(51) Int. Cl.
*A61H 1/02* (2006.01)

(52) U.S. Cl.
CPC ..... *A61H 1/0288* (2013.01); *A61H 2201/123* (2013.01); *A61H 2201/165* (2013.01); *A61H 2201/1676* (2013.01); *A61H 2205/067* (2013.01)

(58) Field of Classification Search
CPC .......... A61H 1/0288; A61H 2201/1676; A61H 2201/165; A61H 2201/1638;
(Continued)

(56) References Cited

U.S. PATENT DOCUMENTS 5,697,892 A 12/1997 Torgerson
9,889,059 B2 * 2/2018 Arakawa .............. A61H 1/0288
(Continued)

FOREIGN PATENT DOCUMENTS

CN 105597280 A 5/2016
CN 105943308 A 9/2016
(Continued)

*Primary Examiner* — Brandy S Lee
*Assistant Examiner* — Mishal Zahra Hussain
(74) *Attorney, Agent, or Firm* — Laurence A. Greenberg; Werner H. Stemer; Ralph E. Locher

(57) ABSTRACT

A finger motion rail, and a therapeutic device with a finger motion rail for carrying out a continuous, passive and/or actively assisted movement of a finger and/or thumb. A multi-joint hinge, arranged laterally alongside a finger and/or thumb, for flexion of a metacarpophalangeal joint. The multi-joint hinge is operatively connected via a first connection lever, at least one second connection lever and at least one connection joint, to a mechanism also arranged laterally alongside the respective finger and/or thumb, for flexion of a proximal interphalangeal joint and/or a distal interphalangeal joint. The finger motion rail and therapeutic device is configured as robust against the effect of compressive, tensile and torsional forces, with respect to a longitudinal axis of the finger motion rail, and it permits precise and interference-free execution of an anatomically natural, auto-
(Continued)

mated finger movement, for increased chance of successful therapy and the service life of the device.

6 Claims, 4 Drawing Sheets

(58) Field of Classification Search
CPC ............... A61H 2201/123; A61F 5/013; A61F 2005/0144; A61F 2005/0146
See application file for complete search history.

(56) References Cited

U.S. PATENT DOCUMENTS

| | | | | |
|---|---|---|---|---|
| 10,849,815 | B2 * | 12/2020 | Huang | A61H 1/0288 |
| 11,357,691 | B2 * | 6/2022 | Lindemann | A61H 1/0288 |
| 2011/0196509 | A1 | 8/2011 | Jansen et al. | |
| 2014/0288664 | A1 * | 9/2014 | Miyazawa | A61F 2/586 623/24 |
| 2018/0185231 | A1 * | 7/2018 | Huang | A61H 1/0288 |
| 2019/0209412 | A1 | 7/2019 | Lindemann | |

FOREIGN PATENT DOCUMENTS

| | | | | |
|---|---|---|---|---|
| CN | 107260490 | A | 10/2017 | |
| CN | 108883023 | A | 11/2018 | |
| DE | 112017000012 | B4 | 7/2018 | |
| EP | 2549971 | B1 | 12/2014 | |
| JP | 2011115248 | A | 6/2011 | |
| WO | 2014178694 | A1 | 11/2014 | |
| WO | WO-2017140302 | A2 * | 8/2017 | A61H 1/0288 |

* cited by examiner

FINGER MOTION RAIL FOR CARRYING OUT A CONTINUOUS, PASSIVE AND/OR ACTIVELY ASSISTED MOVEMENT OF A FINGER AND/OR A THUMB OF A PATIENT, AS WELL AS A THERAPEUTIC DEVICE COMPRISING A FINGER MOTION RAIL OF THIS TYPE

FIELD AND BACKGROUND OF THE INVENTION

The present invention relates to a finger motion rail for carrying out a continuous, passive and/or actively assisted movement of a finger and/or a thumb of a patient, comprising: a means, arranged laterally alongside the respective finger and/or thumb, for flexion of a metacarpophalangeal joint; a mechanism, arranged laterally alongside the respective finger and/or thumb, for flexion of a proximal interphalangeal joint and/or a distal interphalangeal joint, which mechanism has a first connection lever for connecting the mechanism to the means for flexion of a metacarpophalangeal joint, and at least one pivot lever, operatively connected to the first connection lever, for interaction with the proximal interphalangeal joint and/or with the distal interphalangeal joint.

The present invention further relates to a therapeutic device for carrying out a continuous, passive and/or actively assisted movement of the finger and/or thumb of a hand of a patient, comprising: one or more finger motion rails of this type.

For continuous, passive and/or actively assisted joint mobilization, in particular after operations in the hand region, a number of finger motion rails or therapeutic devices are known from the prior art which permit an automated movement of individual and/or multiple fingers.

U.S. Pat. No. 5,697,892 A discloses, for example, a device for continuous passive movement of the hand, with which flexion and extension movements of the fingers can be carried out. A disadvantage of the above is that the finger movement is restricted by mechanical motion kinematics resting on the fingers. In addition, the fingers cannot be treated individually and independently of one another.

To avoid this, EP 2 549 971 B1 has disclosed a hand rehabilitation device which is distinguished by flexible rods for a passive and actively assisted simultaneous and/or selective flexion/extension of the five fingers according to a complete flexion movement or gripping of objects and/or simulation of everyday activities with exercises, sequences and/or combinations of movements freely settable by the user, and elements for the sliding and supporting of the flexible rods during the flexion/extension of the fingers. Here too, however, the rods are disadvantageously arranged directly above the fingers and can restrict the freedom of movement.

JP 2011 115 248 A and US 2014/028 86 64 A1 have disclosed devices for supporting a finger movement, the movement mechanisms of which devices are arranged laterally alongside the respective fingers, such that a restriction of movement caused by resting on the finger is avoided. JP 2011 115 248 A discloses a device for supporting a movement, in particular a finger motion rail, which is intended to be able to place a three-joint region in a naturally flexed posture. By contrast, US 2014/0288664 A1 discloses a finger movement support device which uses sensor technology to determine the user's intention as regards a desired finger movement ("flexion or extension") and then supports this movement with the aid of piezoelectric drives arranged on each phalanx.

However, on account of their design principle, both devices can be adapted only inadequately to the differentiated anatomical shapes of the fingers or thumbs of different patients, as a result of which the automated movement of the fingers carried out by them can deviate to a relatively large extent from a natural movement.

To improve this, DE 11 2017 000 012 B4 has disclosed a therapeutic device for carrying out a continuous, passive and/or actively assisted movement of the fingers and the thumb of the hand of a patient, which allows each selected finger to be provided with its own finger motion rail with kinematics of movement, which finger motion rail, arranged to the side of the finger that is to be treated, allows the latter an unimpeded flexion and/or extension movement. The known finger motion rail is based on a carriage/rail movement kinematics, which permits an automated finger movement that comes very close to an anatomically natural finger movement. However, here the carriage is only slidably guided in the rail and can therefore, under certain circumstances, be susceptible to twisting or to the action of axial forces, i.e. forces acting on a longitudinal axis of the device, which in turn can have a negative influence on the automated finger movement.

In this context, US 2018/018 52 31 A1 discloses a portable finger rehabilitation device which comprises a thumb mechanism, three finger mechanisms for index finger, middle finger and ring finger and a movement mechanism for the little finger and which can be arranged on the back of the user's hand. The movement of the individual movement mechanisms is realized in this case by a kind of multi-joint hinge, which in turn is moved by means of a telescopic drive. The telescopic drive is pivotably connected to the multi-joint hinge directly via a pivot point and moves along with it during operation, as a result of which the supply cables of the drive (e.g. power supply) are constantly subjected to a mechanical action, which can promote wear and tear, for example cable breaks.

SUMMARY OF THE INVENTION

The object of the present invention is therefore to make available a finger motion rail which is improved in relation to the prior art, and also an improved therapeutic device for carrying out a continuous, passive and/or actively assisted movement of a finger and/or a thumb of a patient, which permits an anatomically natural, unimpeded and automated finger movement and at the same time is durable and robust in relation to external forces.

The finger motion rail or the therapeutic device is intended to be more robust against the action of axial forces and torsional forces, in particular as compared to the therapeutic device which is disclosed in DE 11 2017 000 012 B4 and to the movement principle of which this application expressly refers.

This object is achieved, as regards a finger motion rail and a therapeutic device, by the features of the claims. Advantageous embodiments and developments that can be used individually or in combination with one another are the subject matter of the dependent claims.

A finger motion rail according to the invention is distinguished from finger motion rails of the type in question by the fact that the means for flexion of a metacarpophalangeal joint is designed as a multi-joint hinge which, in addition to the connection via the first connection lever, via at least one second connection lever and at least one connection joint, is operatively connected to the mechanism for flexion of a proximal interphalangeal joint and/or a distal interphalangeal joint.

A therapeutic device according to the invention is accordingly characterized in that it comprises a holder for connecting the therapeutic device to the hand of a patient, wherein the holder has a superstructure to which one or more finger motion rails according to the invention are connected for each selected finger, and at least one movement drive for the motorized driving of one or more such finger motion rails, and at least one control device which is in control connection with the one or more finger motion rails according to the invention.

Compared to the prior art, a therapeutic device according to the invention or a finger motion rail according to the invention with a means, designed as a multi-joint hinge, for flexion of a metacarpophalangeal joint is noticeably more robust against the action of compressive and tensile forces that act along the longitudinal axis of the finger motion rail, and also against the action of rotational or torsional forces with respect to the longitudinal axis of the finger motion rail. This advantageously permits more precise and more interference-free execution of an anatomically natural (elliptical), automated finger movement, which can advantageously increase the success of the therapy. Moreover, the service life of the device is advantageously increased in relation to the prior art.

Additional details and further advantages of the invention are described below with reference to preferred exemplary embodiments and in conjunction with the accompanying drawing.

DETAILED DESCRIPTION OF THE INVENTION

In the following description of preferred embodiments of the present invention, the same reference signs denote the same or comparable components.

Figure 1:
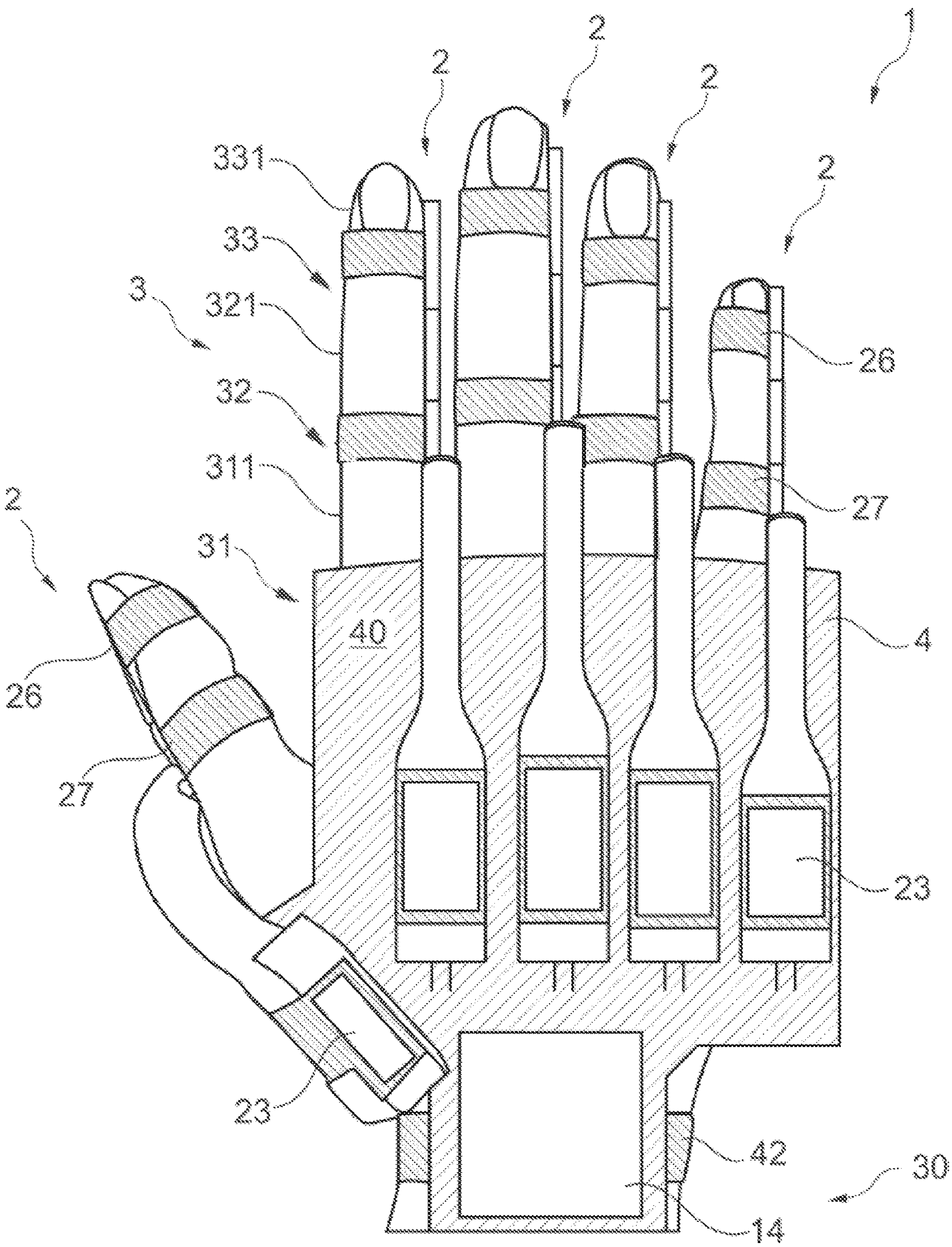
FIG. 1 shows a plan view of the basic structure of a therapeutic device with, by way of example, five finger motion rails on a holder.

FIG. 1 shows an example of a plan view of a basic structure of a therapeutic device 1 with, by way of example, five finger motion rails 2 on a holder 4.

The therapeutic device 1 shown here comprises a holder 4 for connecting the therapeutic device 1 to the hand 3 of a patient, and also one or more, in particular five as shown here, finger motion rails 2 for the fingers and/or the thumb of a patient. The holder 4 advantageously has a superstructure 40 to which one or more finger motion rails 2 can be connected for each selected finger.

The therapeutic device 1 moreover comprises at least one movement drive 23 for the motorized driving of one or more finger motion rails 2, and at least one control device 14 which is in control connection with the one or more finger motion rails 2. The control connection between the finger motion rail 2, or its movement drive 23, and the control device 14 can be made wirelessly (as shown) and/or by cable connections (not shown). The one or more movement drives 23 can preferably be designed as linear drives as shown in FIG. 4, in particular each with a guide rail 232 and with a movement means 235, running along the guide rail 232, for each finger motion rail 2.

The finger motion rails for carrying out a continuous, passive and/or actively assisted movement of a finger and/or a thumb of a patient comprise a means 21, arranged laterally alongside the respective finger and/or thumb, for flexion of a metacarpophalangeal joint 31, and a mechanism 22, arranged laterally alongside the respective finger and/or thumb, for flexion of a proximal interphalangeal joint 32 and/or a distal interphalangeal joint 33, which mechanism has a first connection lever 2113 for connecting the mechanism 22 to the means 21 for flexion of a metacarpophalangeal joint 31, and at least one pivot lever 2201 (or two as shown here), operatively connected to the first connection lever 2113, for interaction with the proximal interphalangeal joint 32 and/or with the distal interphalangeal joint 33.

Figure 2:
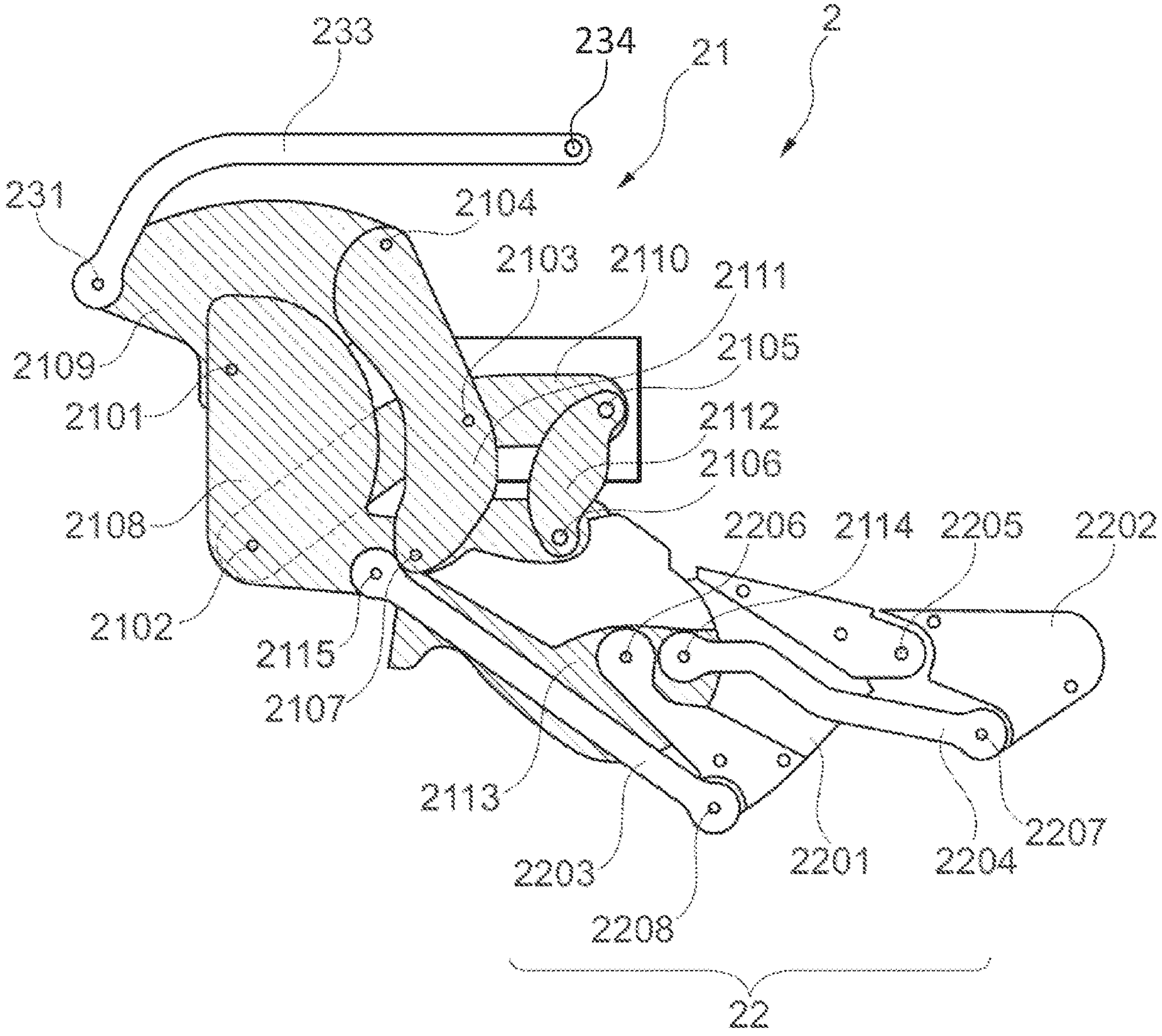
FIG. 2 shows a side view of an embodiment of a finger motion rail according to the invention in an extended position.
Figure 3:
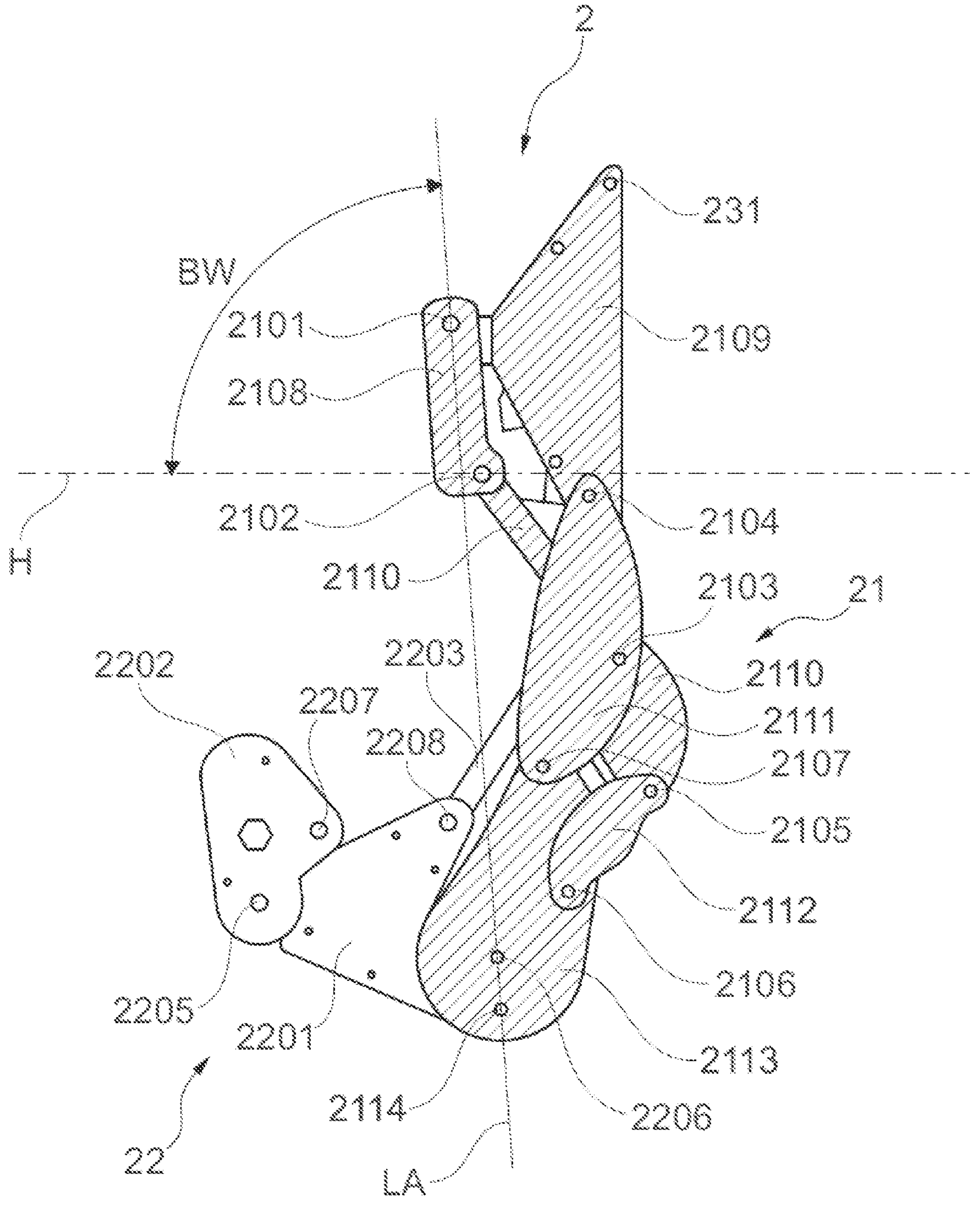
FIG. 3 shows a side view of a further embodiment of a finger motion rail according to the invention in a flexed position.
Figure 4:
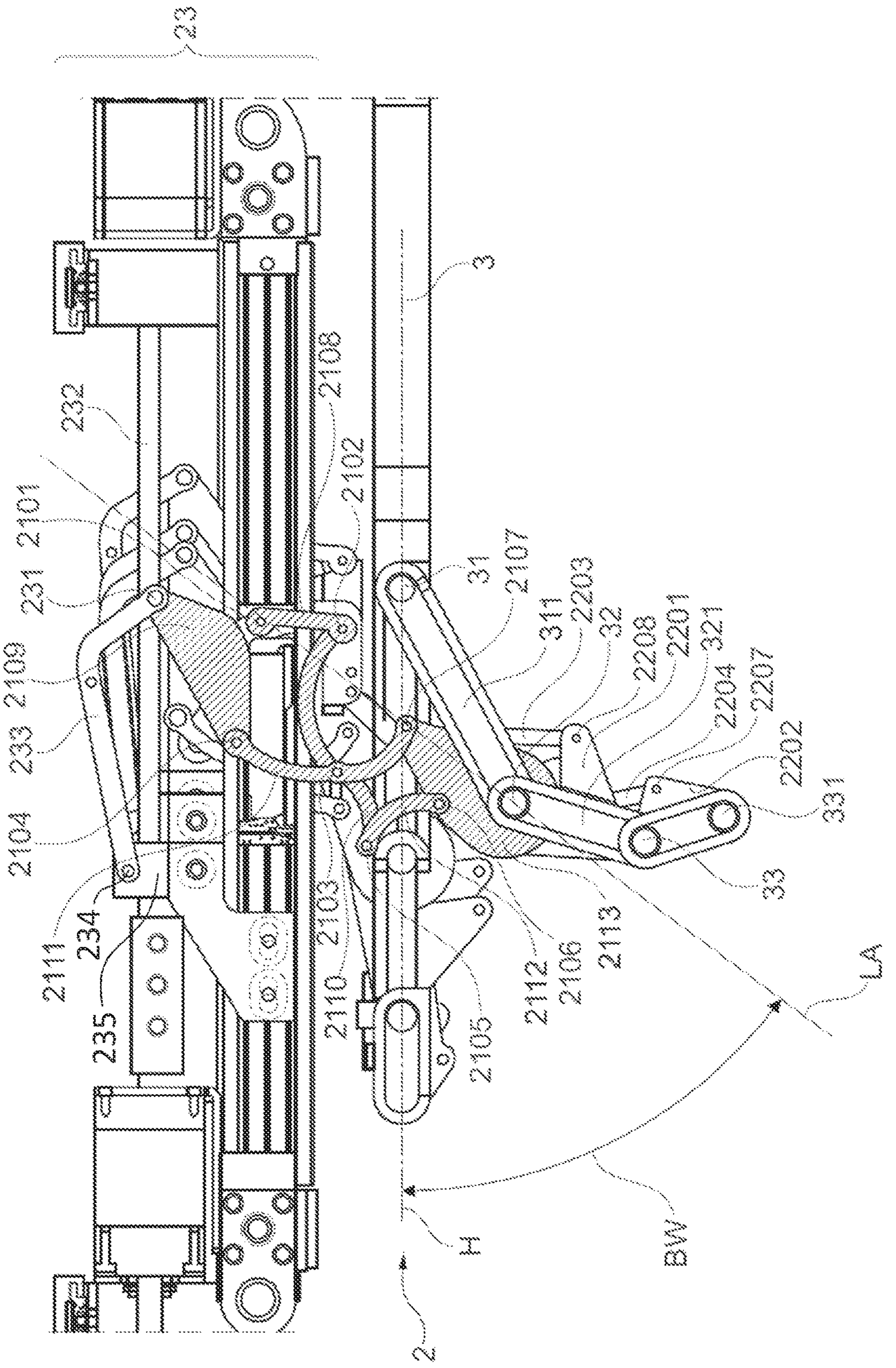
FIG. 4 shows a side view of a further embodiment of a therapeutic device with several finger motion rails and movement drives in a further embodiment.

In FIGS. 2 to 4, components that belong to the means 21 for flexion of a metacarpophalangeal joint 31 are shown with hatching for the purpose clarity.

The interaction with the respective distal interphalangeal joint 33 and/or with the proximal interphalangeal joint 32 can preferably be effected here via a first detachable fastening and/or bearing means 26 for fastening to the first 2201 or second 2202 pivot lever and/or a second detachable fastening and/or bearing means 27 for fastening to the first connection lever 2113, wherein the detachable fastening and/or bearing means 26 and 27 for fastening and/or bearing the fingers, and also the detachable fastening means 42 for fastening the holder 4 to the forearm and/or the hand 3, are advantageously designed to be adjustable in size and can thus be universally usable for different sizes of the body part that is to be fastened.

FIG. 2 and FIG. 3 now show embodiments of a finger motion rail 2 according to the invention in an extended position (FIG. 2) and in a flexed position (FIG. 3), each in a side view. The embodiments shown in FIGS. 2 and 3 are intended in particular to illustrate the operating principle of the multi-joint hinge as the means 21 for flexion of a metacarpophalangeal joint 31.

According to the invention, the means 21 for flexion of a metacarpophalangeal joint 31 is designed as a multi-joint hinge which, in addition to the connection via a first connection lever 2113, via at least one second connection lever 2203, in particular in addition via a third connection lever 2204, and at least one connection joint 2114; 2115, is operatively connected to the mechanism 22 for flexion of a proximal interphalangeal joint 32 and/or a distal interphalangeal joint 33. The means 21 designed as a multi-joint hinge for flexion of a metacarpophalangeal joint 31 permits a movement about the respective ("virtual") metacarpophalangeal joint 31, whereby the movement generated advantageously corresponds to an anatomically "natural" (elliptical) finger movement.

In a preferred embodiment of the invention, the means 21 for flexion of a metacarpophalangeal joint 31 can comprise, for example, seven joints 2101; 2102; 2103; 2104; 2105; 2106 and 2107, which each connect two of the six levers 2108; 2109; 2110; 2111; 2112 and 2113 to each other in a rotatable manner. It is advantageous if the means 21 for flexion of a metacarpophalangeal joint 31 has a first lever 2108 for rigid connection to a holder 4 of a therapeutic device 1 for carrying out a continuous, passive and/or actively assisted movement of the fingers and/or the thumb of the hand 3 of a patient. Such a lever 2108 can advantageously permit a stable arrangement of one or more finger motion rails 2 on the holder 4 of a therapeutic device 1 for carrying out a continuous, passive and/or actively assisted movement of the fingers and/or the thumb of the hand 3 of a patient. The first lever 2108 can also advantageously predefine the structural distance between the first joint 2101 and the second joint 2102 and thus determine the lever-mechanical interaction in particular of a second lever 2109, third lever 2110 and fourth lever 2111 of the means 21 for flexion of a metacarpophalangeal joint 31. The lever 2108 can, as it were, advantageously serve as a distance measure for the design of the multi-joint hinge as the means 21 for flexion of a metacarpophalangeal joint 31.

In addition, an embodiment has proven useful in which a second lever 2109 is preferably rotatably connected to the first lever 2108 via a first joint 2101. The second lever 2109 can in this case advantageously comprise at least one engagement joint 231 for operative connection to a movement drive 23. FIG. 2 shows that for this purpose a connection element 233 can be provided on the engagement joint 231, for example, which can advantageously bring the lever 2109 into operative connection with a movement drive 23, in particular a linear drive (see also FIG. 4). At the end of the connection element 233 opposite the engagement joint 231, it is possible, for example, to arrange a connection joint 234 to a movement means 235 of the movement drive 23. During operation, the movement means 235 can then be moved along the guide rail 232 and in turn can move the connection element 233 via the connection joint 234. By way of the engagement joint 231, this movement of the connection element 233 can then set in motion in particular the second lever 2109 and thus finally the entire means 21, designed as a multi-joint hinge, for flexion of the metacarpophalangeal joint 31. The movement drive 23, in particular its stationary components such as the guide rail 232 for example, remains rigid with respect to the first lever 2108, that is to say the orientation of the movement drive 23 with respect to the orientation of the multi-joint hinge as the means 21 for flexion of a metacarpophalangeal joint 31 remains constant. It will be seen in FIG. 4 that in this way the linear drive movement of the movement drive 23, effected via the movement of the movement means 235 along the guide rail 232, can advantageously be converted into a circular movement of the means 21, designed as a multi-joint hinge, for flexion of a metacarpophalangeal joint 31, wherein it is advantageously possible to dispense with swiveling of the movement drive 23 with respect to the means 21, designed as a multi-joint hinge, for flexion of a metacarpophalangeal joint 31. This not only permits a more compact design of the therapeutic device 1 but also facilitates, for example, cable routing to the movement drive 23, avoids repeated cable movements during operation and thereby advantageously increases the service life of the therapeutic device 1.

The guide rail 232 can also advantageously permit an adaptation to the anatomical conditions of the respective patient, in particular a length adaptation to the length of the finger.

In a further preferred embodiment of the invention, a third lever 2110 can advantageously be rotatably connected to the first lever 2108 via a second joint 2102, wherein the second lever 2109 preferably via a fourth joint 2104 and the third lever 2110 preferably via a third joint 2103 can be rotatably connected to each other via a fourth lever 2111. It is also advantageous if the distance between the second joint 2102 and the third joint 2103 is approximately twice as long as the distance between the third joint 2103 and the fifth joint 2105.

In addition, it has proven useful if the third lever 2110 is rotatably connected to a fifth lever 2112 via a fifth joint 2105. It is advantageous here if the fourth lever 2111 via a seventh joint 2107 and the fifth lever 2112 via a sixth joint 2106 are rotatably connected to each other via the connection lever 2113.

FIG. 3 shows a side view of a further preferred embodiment of a finger motion rail 2 according to the invention in a flexed position. It will be seen that the means 21 for flexion of a metacarpophalangeal joint 31 can advantageously permit the flexion of a finger about the metacarpophalangeal joint 31 in an angle range from −15° to 90°, preferably between 0° and 90°, with respect to an angle BW between the longitudinal axis LA of the finger motion rail 2, in particular the axis between the first joint 2101 and the second joint 2206 arranged between the first pivot lever 2201 and sixth lever 2113, and a horizontal H (equivalent to one finger extended in the same orientation as the palm of the hand).

Finally, in a further embodiment of the invention, the mechanism 22 for flexion of a proximal interphalangeal joint 32 and/or a distal interphalangeal joint 33 can advantageously permit a combined flexion of the proximal interphalangeal joint 32 and the distal interphalangeal joint 33, by which a distal phalanx 331 is oriented approximately parallel to a proximal phalanx 311 at the end of the flexion (see once again another embodiment in a flexed position in FIG. 4).

The interaction of the means 21 for flexion of a metacarpophalangeal joint 31 and of the mechanism 22 for flexion of a proximal interphalangeal joint 32 and/or a distal interphalangeal joint 33 via the (common) connection lever 2113 advantageously permits an anatomically natural, automated finger movement over the full range of movement of the fingers and/or the thumb of a hand 3, wherein restrictions on movement, caused in particular by components resting on the fingers or the thumb, are advantageously avoided. The means 21 designed as a multi-joint hinge for flexion of a metacarpophalangeal joint 31 is robust against axial forces and torsional forces, in particular with respect to the longitudinal axis LA of the finger motion rail 2, which advantageously increases the interference resistance of the finger movement executed by the finger motion rail 2 or the therapeutic device 1.

The present invention relates to a finger motion rail 2, and to a therapeutic device 1 for carrying out a continuous, passive and/or actively assisted movement of a finger and/or a thumb of a patient. It is characterized in that a means 21, arranged laterally alongside the respective finger and/or thumb, for flexion of a metacarpophalangeal joint 31 is designed as a multi-joint hinge which, in addition to the connection via a first connection lever 2113, via at least one second (and/or third) connection lever 2203; 2204 and at least one connection joint 2114; 2115, is operatively connected to a mechanism 22, also arranged laterally alongside the respective finger and/or thumb, for flexion of a proximal interphalangeal joint 32 and/or a distal interphalangeal joint 33. The finger motion rail 2 according to the invention or a therapeutic device 1 comprising same is notably more robust against the effect of compressive, tensile and torsional forces, in particular with respect to a longitudinal axis LA of the finger motion rail 2, and it advantageously permits a more precise and more interference-free execution of an anatomically natural, automated finger movement, which increases the chance of successful therapy and the service life of the device.

Compared to the prior art, a therapeutic device 1 according to the invention or a finger motion rail 2 according to the invention with a means 21, designed as a multi-joint hinge, for flexion of a metacarpophalangeal joint 31 is noticeably more robust against the action of compressive and tensile forces that act along the longitudinal axis of the finger motion rail 2, and also against the action of rotational or torsional forces with respect to the longitudinal axis LA of the finger motion rail 2. This advantageously permits more precise and more interference-free execution of an anatomically natural (elliptical), automated finger movement, which can advantageously increase the success of the therapy. Moreover, the service life of the device is advantageously increased in relation to the prior art.

LIST OF REFERENCE SIGNS

- 1 therapeutic device
- 2 finger motion rail
- 21 means for flexion of a metacarpophalangeal joint=multi-joint hinge
  - 2101 first joint
  - 2102 second joint
  - 2103 third joint
  - 2104 fourth joint
  - 2105 fifth joint
  - 2106 sixth joint
  - 2107 seventh joint
  - 2108 first lever
  - 2109 second lever
  - 2110 third lever
  - 2111 fourth lever
  - 2112 fifth lever
  - 2113 connection lever
  - 2114 first connection joint
  - 2115 second connection joint
- 22 mechanism (for flexion of the proximal interphalangeal joint and the distal interphalangeal joint)
  - 2201 first pivot lever
  - 2202 second pivot lever
  - 2203 second connection lever
  - 2204 third connection lever
  - 2205 first joint
  - 2206 second joint
  - 2207 third joint
  - 2208 fourth joint
- 23 movement drive
- 231 engagement joint for connection to the movement drive 23
- 232 guide rail
- 233 connection element
- 234 connection joint to the movement means 235
- 235 movement means
- 26 first fastening and/or bearing means for fastening to the first pivot lever 2201
- 27 second fastening and/or bearing means for fastening to the first connection lever 2113
- 3 hand
  - 30 wrist
  - 31 metacarpophalangeal joint
    - 311 proximal phalanx
  - 32 proximal interphalangeal joint
    - 321 middle phalanx
  - 33 distal interphalangeal joint
    - 331 distal phalanx
- 4 holder
  - 40 superstructure
  - 42 fastening means

The invention claimed is:

1. A finger motion rail for carrying out a continuous, passive and/or actively assisted movement of a finger and/or a thumb of a patient, comprising:

a multi-joint hinge, arranged laterally alongside a respective finger and/or thumb, for flexion of a metacarpophalangeal joint, the multi-joint hinge having:

a first lever rigidly connected to a holder of a therapeutic device for carrying out a continuous, passive and/or actively assisted movement of the fingers and/or the thumb of the hand of a patient, a second lever being rotatably connected to said first lever at a first joint, said second lever having at least one engagement joint connected to a movement drive, a third lever being rotatably connected to said first lever at a second joint, said second lever at a fourth joint and said third lever at a third joint being rotatably connected to each other via a fourth lever, said third lever being rotatably connected to a fifth lever at a fifth joint, and said fourth lever at a seventh joint and said fifth lever at a sixth joint being rotatably connected to each other via said first connection lever, a mechanism, arranged laterally alongside the respective finger and/or thumb, for flexion of a proximal interphalangeal joint and/or a distal interphalangeal joint, and a first connection lever for connecting said mechanism to said multi-joint hinge; and at least one pivot lever, operatively connected to said first connection lever, for interaction with said proximal interphalangeal joint and/or with said distal interphalangeal joint, said multi-joint hinge being operatively connected to said mechanism via at least one second connection lever and at least one connection joint.

2. The finger motion rail according to claim 1, wherein said multi-joint hinge is operatively connected to said mechanism via said at least one second connection lever and at least one third connection lever and said at least one connection joint.

3. The finger motion rail according to claim 1, wherein said multi-joint hinge is configured to flex the axis between the first joint and the second joint, which is arranged between the first pivot lever and connection lever, in an angle range from −15° to 90° with respect to an angle between a longitudinal axis of the finger motion rail and a horizontal.

4. The finger motion rail according to claim 1, wherein said multi-joint hinge is configured to flex the axis between the first joint and the second joint, which is arranged between the first pivot lever and connection lever, in an angle range from 0° and 90° with respect to an angle between a longitudinal axis of the finger motion rail and a horizontal.

5. The finger motion rail according to claim 1, wherein said multi-joint hinge permits the flexion of a finger about an axis between said at least one engagement joint connected to said movement drive and a second joint between said first pivot lever and a sixth lever, and a horizontal.

6. A therapeutic device for carrying out a continuous, passive and/or actively assisted movement of a finger and/or a thumb of a hand of a patient, the therapeutic device comprising:

one or more finger motion rails according to claim 1;

a holder for connecting the therapeutic device to the hand of a patient, said holder having a superstructure to which said one or more finger motion rails are connected for each selected finger;

at least one movement drive configured for motorized driving of said one or more finger motion rails; and at least one control device, arranged in control connection with said one or more finger motion rails.

* * * * *